R. Hare,
Blow Pipe.
Nº 4,104. Patented July 5, 1845.
PLATE I.
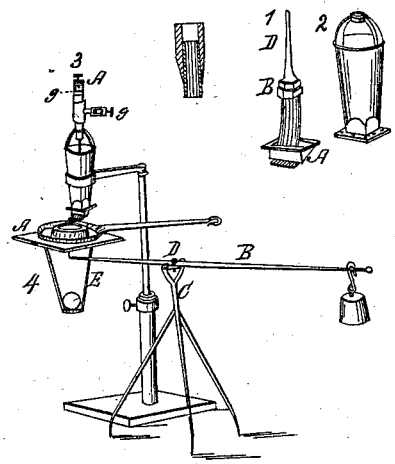
PLATE III.
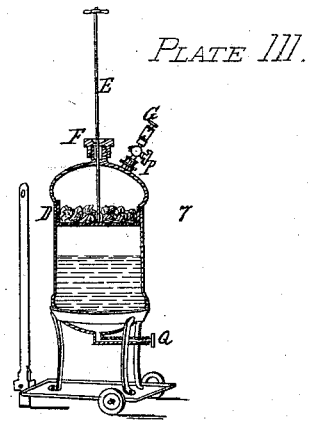
PLATE II.
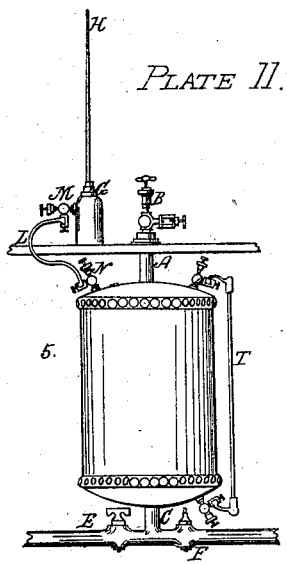
PLATE IV.
VI.
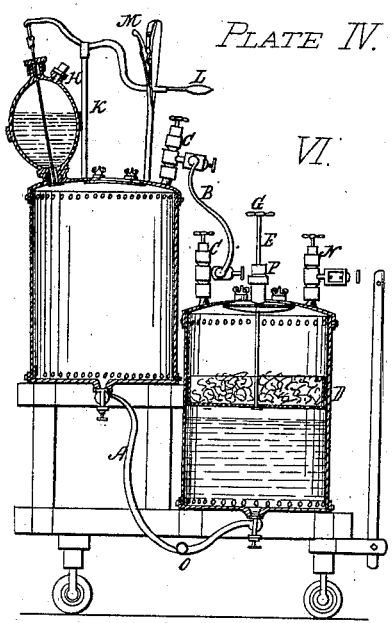

UNITED STATES PATENT OFFICE.

ROBERT HARE, OF PHILADELPHIA, PENNSYLVANIA.

IMPROVEMENT IN HYDRO-OXYGEN BLOW-PIPES.

Specification forming part of Letters Patent No. 4,104, dated July 5, 1845.

*To all whom it may concern:*

Be it known that I, ROBERT HARE, M. D., of the city of Philadelphia, Pennsylvania, have invented certain Improvements in the Compound Hydro-Oxygen or Hydrostatic Blow-Pipe, (originally invented by me in the year 1801, and in the apparatus connected therewith,) so as to render it more applicable than it was in its original form, or in any of its subsequent modifications to the fusion of platinum and to other purposes, the exact nature and description of which improvements are as follows.

The nature of my improvement consists in the employment of a plurality of jet-pipes associated as at A, Plate 1, Figure 1, or of one jet-pipe, Fig. 4, divided by the insertion of coarse wire or other means into a variety of orifices through which a stream of oxygen and hydrogen, proceeding either from two different receivers and mixed at the box A, Plate 1, Fig. 3, or from one receiver in which they are previously mingled in proper proportions, is made to flow, so that at the point of efflux the gases issue forth in two or more jets, the pipe or pipes being preferably refrigerated by passing through a box or case, C, Plate 1, Figs. 2 and 3, filled with water or other refrigerating substance.

For the purpose of keeping the gases, whether mixed or separate, under the equable pressure necessary to cause them to flow forth from the blow-pipe with the proper velocity, I have employed iron reservoirs, of which the cylindrical vessel, Fig. 5, Plate 2, is a representation, furnished at the bottom with a pipe, C, set at right angles into a horizontal pipe communicating on the one side with the gutter, on the other with the mains by which the city is supplied with water, so that by opening the cock F the receiver will be filled with water, and on closing it and opening the cock E and valve-cock B at the top of the vessel, the latter communicating by a pipe with a bell-glass sufficiently supplied by a current of oxygen from the generating apparatus, this gas will take the place of the water previously occupying the cavity of the vessel. The vessel being thus filled, the contents may be subjected to pressure by closing the valve-cock B and cock E and opening the cock F.

Of course the pressure of any reservoir of water sufficiently elevated may be substituted for that of the hydrant by opening a communication with it through the cock E. A glass tube forming a communication between the upper and lower portions of the cavity of the vessel enables the height of the water to be ascertained, and, if graduated, thus indicates the quantity of gas introduced or withdrawn.

M G H represent a gage, which is made of a cast-iron flask of about half a pint in contents and a glass tube of about a quarter of an inch in bore, which should be at least five feet in height. The tube is secured air-tight into the neck of the flask, so as to reach very near to the bottom within. The flask is about three-fourths full of mercury. A communication being established between the cavity of the flask and that of the reservoir, and an equilibrium of pressure resulting, it is measured by a corresponding rise of the mercury in the tube.

In order to obtain a stream of hydrogen gas of the requisite pressure and rapidity, I have also employed the apparatus represented in Plate 3, consisting of a copper vessel of the strength requisite to resist the pressure which the operator may desire to employ, half-filled with diluted sulphuric acid, and furnished with a tray, D, loaded with zinc and capable of being raised or lowered at will by means of the rod E passing at the top through an air-tight stuffing-box, F, so that the operator may at pleasure depress it below the surface of the acid and cause the evolution of hydrogen gas from the zinc, and when a sufficient pressure has been produced, as ascertained by a gage, again remove it from the acid more or less.

Another apparatus for producing the requisite stream of hydrogen is represented in Plate 4, and consists of two similar iron vessels lined inside with copper and situated upon a frame of wood, so that the bottom of one is at half the height of the top of the other, the upper parts of the said vessels communicating by a pipe, B, furnished with a cock, and the lower parts of the said vessels by another pipe, A, joining the bottoms of the said vessels. The upper vessel is surmounted by a chamber, of which the object is to introduce an additional portion of acid without allowing such an escape of gas as to reduce the pressure within the apparatus to an equilibrium with that of the atmosphere. The valve at the end of the rod attached to the lever L being kept shut by the catch M and the screw-plug H removed, the acid is poured in through the aperture thus opened. The plug H being replaced and the valve opened by means of the lever and rod, the acid descends from the chamber into the cavity of the vessel below it. The lower vessel is filled half-full of diluted sulphuric acid and contains a tray, D, loaded with zinc and suspended by a rod, G, passing through a stuffing-box, so as to permit the zinc placed on the tray to be removed from or lowered into the diluted acid at pleasure. In order to produce the current of hydrogen for the purposes of the blow-pipe, the communication through the lower pipe between the bottoms of the vessels being open, the communication through the upper pipe between the tops of the vessels is opened by turning the cock C and the zinc on the tray is lowered by means of the rod to which it is attached into the acid until the quantity of hydrogen generated is sufficient to produce half the pressure, as ascertained by a gage, (see M G H, Plate 2,) which it is thought necessary to attain. The upper pipe is then closed and the pressure of the gas increases in the lower vessel until it drives the acid with which it is half-filled into the upper vessel, where the pressure will then of course be double what it was at the period of closing the upper pipe. By opening the communicating-pipe between the lower vessel and the jet-pipes a stream of hydrogen gas is furnished of a nearly equable pressure, since whenever the pressure decreases in the lower vessel the acid descends from the upper one upon the zinc, and by causing an increased evolution of gas sustains the pressure.

When the gases are made to proceed to the blow-pipe from one receiver in which they are previously mixed, they should be conveyed from the receiver into an iron mercury-bottle or other strong recipient about half-full of oil of turpentine by a pipe descending about two inches below the surface of the turpentine, while by another tube the gaseous mixture is conveyed from the cavity above the turpentine to the jet-pipes. By these means the flame is prevented from retroceding so as to reach the reservoir, an inexplosive combination being formed by the contact of inflamed hydrogen and oxygen with the oil of turpentine.

The apparatus for sustaining the platinum or other substance to be fused consists, Plate 1, Fig. 3, of a brick of kaolin or other infusible earth in an iron pan with a handle supported on a platform, A, lever D poised as its center of gravity upon a vertical point, D'. A cannon-ball is attached by a stirrup, E, to the platform, so as to keep it always in a horizontal position, while the operator is enabled by means of the movable pan-lever and universal joint to expose the metal to the hottest part of the flame.

What I claim as my improvement on the hydro-oxygen blow-pipe and in the processes for supplying this instrument with gas, and desire to secure by Letters Patent, is as follows:

1. The employment of more than one jet-pipe or several jet-pipes so associated as to produce a large flame by the combination of several smaller flames or jets, or of one jet-pipe so crammed with coarse wire as to cause the gaseous mixture to escape into the air at the point of efflux in several jets, as already described, in lieu of one, as in using the instrument originally invented by me, and in all subsequent modifications prior to the one for which I now desire a patent, for, although in the concentric pipes used first by me and afterward by Daniells and Mangham the hydrogen escaped from one pipe so as to mingle with the oxygen passing out through another, still more than one pipe or one aperture yielding one jet was not used for the efflux of the mixture of the two gases employed. Moreover, although tubes crammed with fine wire have been employed as safety-tubes to prevent the retrocession of the flame, coarse wire has never been heretofore used to cram the tube at the point of efflux, so as to divide the gas at the place of inflammation.

2. The employment of a jet which may be made from between two flat surfaces, whether channeled or not, or, in other words, from a fissure or kerf or row of holes, as set forth.

3. The refrigeration of the jet pipe or pipes by passing it or them through a case or box filled with water or other refrigerating substance, as heretofore described, and represented in Plate 1, Fig. 3.

4. The employment of a vessel provided with a tray and rod like that last described, in combination with another vessel of the same capacity, of which the bottom is above the middle of that first mentioned, both vessels communicating by means of adequate pipes and cocks, so that the gas may pervade both simultaneously, or by shutting a cock may be prevented from reaching the additional vessel, after which, the acid, being driven into the second vessel, its contact with the zinc is prevented or diminished, as more fully made intelligible by the accompanying description and drawings.

5. The employment for the support of the platinum of a brick of kaolin or other infusible earth resting on a platform so balanced on a point or a bell, or in any other way, as to be kept horizontal by attaching to it a weight, and supported by a lever turning on a universal joint, and as represented in Plate 2 and heretofore described.

6. The employment of any variety of carbureted hydrogen for the fusion of platina in lieu of hydrogen in the apparatus above described.

ROBT. HARE.

Witnesses:
JOHN CHANDLER,
WM. SAWYER.